US008970542B2

(12) United States Patent
Murata

(10) Patent No.: US 8,970,542 B2
(45) Date of Patent: Mar. 3, 2015

(54) OPERATION DEVICE AND CONTROL METHOD THEREOF

(75) Inventor: Takemasa Murata, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/171,276

(22) Filed: Jun. 28, 2011

(65) Prior Publication Data

US 2012/0013570 A1 Jan. 19, 2012

(30) Foreign Application Priority Data

Jul. 16, 2010 (JP) ................................ 2010-162102

(51) Int. Cl.
*G06F 3/041* (2006.01)
*G06F 3/0488* (2013.01)
(52) U.S. Cl.
CPC .................................. *G06F 3/04883* (2013.01)
USPC .......................................... 345/174; 345/173
(58) Field of Classification Search
USPC ................................................. 345/172–183
See application file for complete search history.

(56) References Cited

U.S. PATENT DOCUMENTS

| 7,555,728 | B2 * | 6/2009 | Esaki et al. ................... 715/824 |
| 2004/0008129 | A1 | 1/2004 | Philipp |
| 2006/0007166 | A1 * | 1/2006 | Lin et al. ........................ 345/173 |
| 2007/0091070 | A1 * | 4/2007 | Larsen et al. .................. 345/168 |
| 2009/0061928 | A1 * | 3/2009 | Lee et al. ..................... 455/556.1 |
| 2010/0265200 | A1 * | 10/2010 | Cho et al. ....................... 345/173 |
| 2010/0321324 | A1 * | 12/2010 | Fukai et al. .................... 345/173 |
| 2011/0227845 | A1 | 9/2011 | Lin et al. |
| 2011/0291944 | A1 * | 12/2011 | Simmons et al. .............. 345/173 |
| 2012/0262407 | A1 * | 10/2012 | Hinckley et al. ............... 345/173 |

FOREIGN PATENT DOCUMENTS

| GB | 2015219 A | 9/1979 |
| JP | 11-194863 A | 7/1999 |
| JP | 2006-107170 A | 4/2006 |
| JP | 2007-257037 A | 10/2007 |
| JP | 2009-253478 A | 10/2009 |

* cited by examiner

*Primary Examiner* — Kent Chang
*Assistant Examiner* — Nelson Rosario
(74) *Attorney, Agent, or Firm* — Canon USA, Inc., IP Division

(57) ABSTRACT

To prevent an unintended operation from being accepted when a continuous operation is performed on a touch panel, an operation device performs control so that a touch operation is not accepted while a continuous operation on an operation panel by a user is being accepted.

24 Claims, 6 Drawing Sheets

OPERATION DEVICE AND CONTROL METHOD THEREOF

BACKGROUND OF THE INVENTION

1. Field of the Invention

The present invention relates to an operation device for accepting a user's operation and a control method thereof.

2. Description of the Related Art

Conventionally, an operation device for accepting a user's rotation operation is known (see Japanese Patent Application Laid-Open No. 2006-107170). In Japanese Patent Application Laid-Open No. 2006-107170, a rotation member is rotated by the user's rotation operation, and thereby the operation performed by the user is determined.

On the other hand, as an operation device for accepting a user's operation, a touch panel type device is known (see Japanese Patent Application Laid-Open No. 2009-253478). In Japanese Patent Application Laid-Open No. 2009-253478, a position the user touches is recognized and the operation performed by the user is determined.

When applying a continuous operation such as the rotation operation of Japanese Patent Application Laid-Open No. 2006-107170 to the touch panel type operation device of Japanese Patent Application Laid-Open No. 2009-253478, for example, sensors are disposed at a plurality of positions along a predetermined circle and a user performs a tracing operation along the circle.

However, in the touch panel method, the touch panel does not rotate, so that the user cannot perform a correct continuous operation, and the user may touch a position apart from the intended position.

Therefore, if other keys on which touch operations are performed are disposed near the positions where the continuous operation is performed, it may be wrongly recognized that the keys are operated. Thus, other keys may not be disposed near the positions where the continuous operation is performed. Therefore, the flexibility of the arrangement of the keys decreases.

SUMMARY OF THE INVENTION

An aspect of the present invention is to provide an operation device and a control method thereof which solve the above issue.

Another aspect of the present invention is to provide an operation device and a control method thereof which prevent unintended operations from being accepted when a continuous operation is performed on a touch panel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
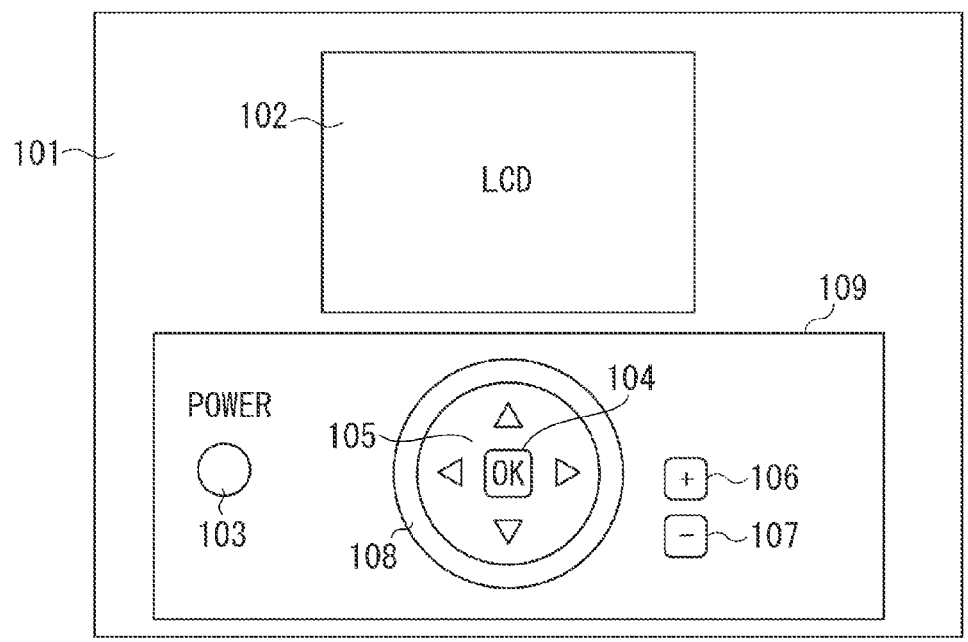
FIG. 1 is an external view of an operation panel.

FIG. 1 is an external view of an operation panel 101 that can be applied to the operation device of the present invention. The external view illustrated in FIG. 1 is an example, and various arrangements of the keys and various input modes can be employed.

The operation panel 101 can be mounted on various information processing devices such as a copy machine, a facsimile machine, a printer, a digital camera, a personal computer, a mobile phone, and a music player. Although these information processing devices on which the operation panel of the present exemplary embodiment is mounted function as an operation device that accepts a user's operation. However, in a device in which the control of the operation panel 101 is separated from the control of the information processing device, a portion which controls the operation panel 101 functions as the operation device.

Hereinafter, an example will be described in which the information processing device functions as the operation device and controls the operation panel 101.

In FIG. 1, a liquid crystal display (LCD) 102 displays a state, an operation menu, and the like of the information processing device on which the operation panel 101 is mounted. The power key 103 is a key for turning on/off a software power source. The information processing device has the software power source in addition to a main power source. When the software power source is turned on, a display on the LCD 102 is started, and the user can instruct the information processing device to perform various kinds of processing.

The OK key 104 is a key for specifying confirmation or affirmation for contents displayed on the LCD 102. The cross key 105 is a key for moving the focus of an item displayed on the LCD 102 and scrolling the items by specifying up/down and left/right directions.

The plus key 106 is a key for increasing the displayed number, and the minus key 107 is a key for decreasing the number. When the user performs a rotation operation (clockwise rotation or counterclockwise rotation) with the user's finger on the rotation portion 108 by tracing the circumference of the rotation portion 108 as a continuous operation, information of clockwise rotation or counterclockwise rotation is input. By the input information, the focus of an item displayed on the LCD 102 is moved or the displayed items are scrolled.

A portion 109 in the operation panel 101 is an electrostatic pad. When the user touches the electrostatic pad 109, the electrostatic capacitance of an electrode of the electrostatic pad 109 changes. Thus, the position the user touches is detected by using the above phenomenon. The electrostatic pad 109 has a thin film on which a plurality of electrodes is disposed according to the positions where the keys 103 to 108 are displayed, and a position the user touches on the thin film is detected based on the changes of electrostatic capacitances of the electrodes. Thereby, what key is operated is determined.

The rotation portion 108 has some thin films and electrodes (sensors) on the circumference thereof, and when it is detected that the areas on the sensors are traced continuously, a rotation operation is determined to be performed. Regarding the other keys, when a touch operation (pressing operation) to the area of the key is detected, the key is determined to be selected. In the touch operation, an operation to trace the area of the keys is not performed.

In these operations, even when the user does not touch the pad, if the change of electrostatic capacitance can be detected, an operation in a non-contact state may be accepted. As described above, for the keys 103 to 107, the pad member is not deformed by the pressing operation by the user, and for the rotation portion 108, the pad member does not rotate by the rotation operation by the user.

Figure 2:
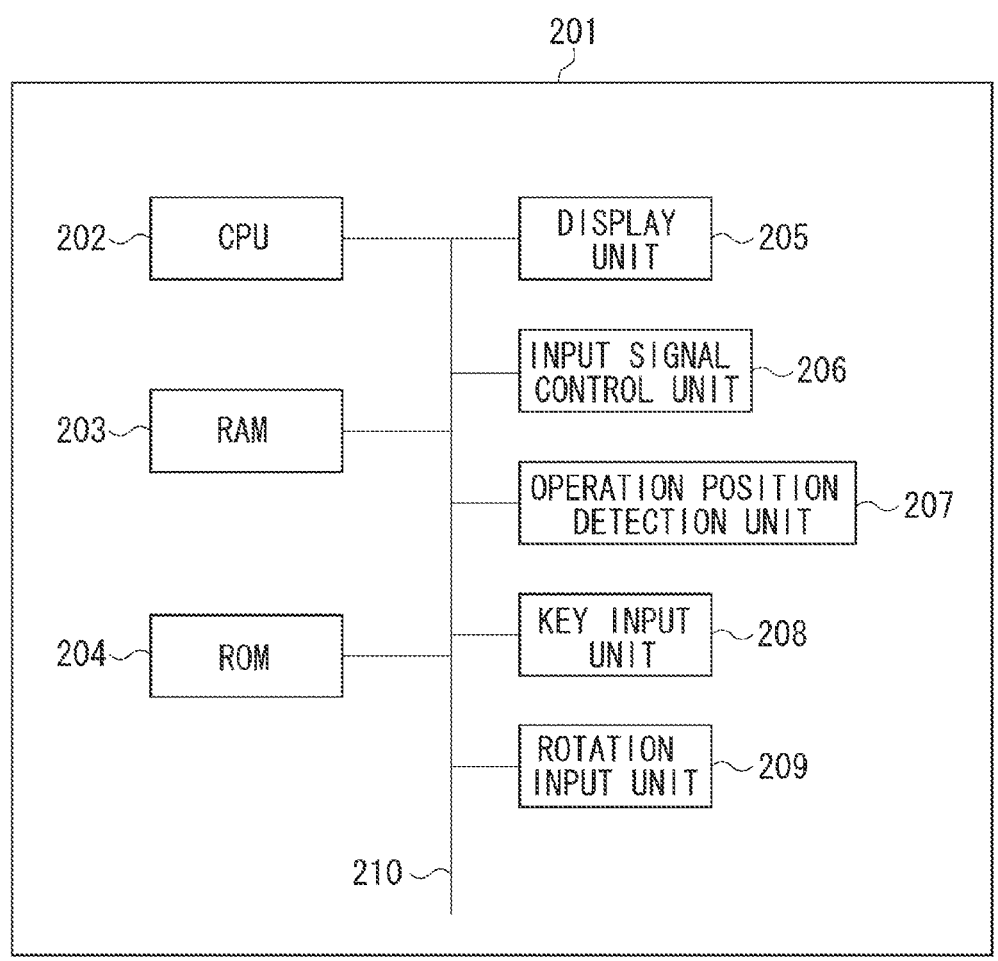
FIG. 2 is a block diagram illustrating a configuration of an information processing device including the operation panel.

FIG. 2 is a block diagram illustrating a configuration of a portion related to the control of the operation panel 101 of the information processing device 201 on which the operation panel 101 of FIG. 1 is mounted.

In FIG. 2, a central processing unit (CPU) 202 controls an entire operation of the information processing device 201 based on a program for controlling the information processing device 201. A random access memory (RAM) 203 is used as a work area of the CPU 202, and stores various setting values. A read-only memory (ROM) 204 stores a control program and the like to be executed by the CPU 202.

A display unit 205 outputs display information to be displayed on the LCD 102. An input signal control unit 206 controls generation of an input signal based on information from an operation position detection unit 207, a key input unit 208, and a rotation input unit 209. The operation position detection unit 207 detects a position corresponding to the keys 103 to 107 or the rotation portion 108 where the user touches on the electrostatic pad 109.

The key input unit 208 determines which key of the keys 103 to 107 receives an input based on operation position information detected by the operation position detection unit 207. The key that receives the input is disposed at a position corresponding to the operation position information. The rotation input unit 209 determines whether a rotation operation on the rotation portion 108 is performed based on operation position information detected by the operation position detection unit 207.

The constituent elements 202 to 209 described above are connected to each other via an internal bus 210, and are capable of communicating with each other. All or part of the above constituent elements 206 to 209 may be implemented by software processing executed by the CPU 202.

Figure 3:
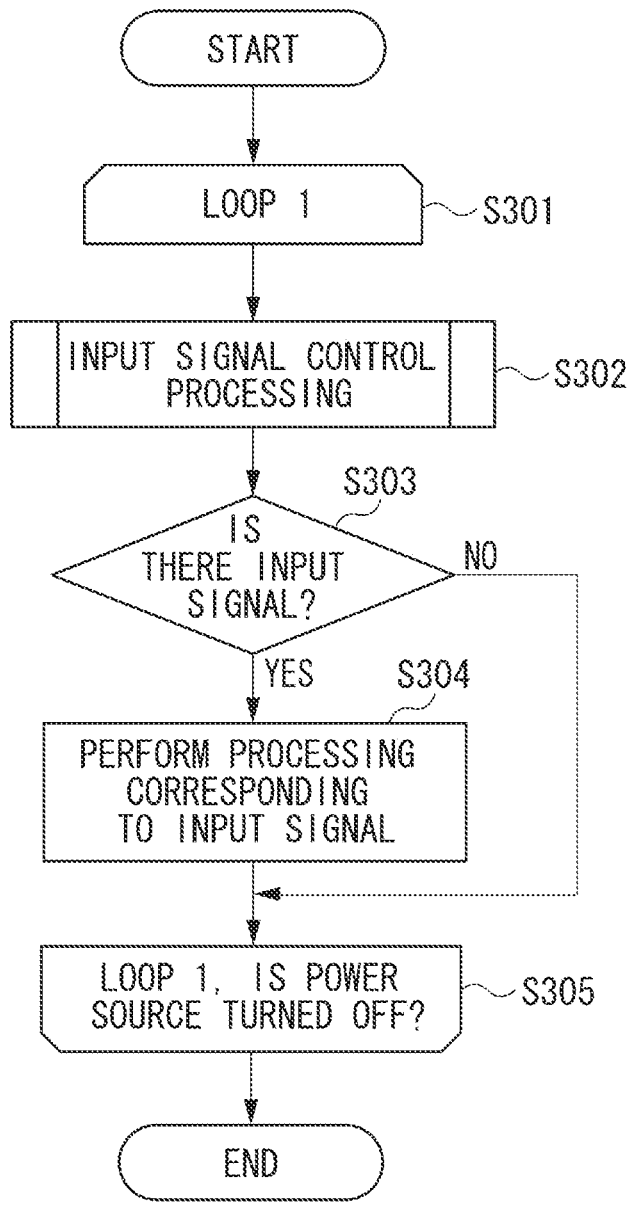
FIGS. 3 to 6 are flowcharts illustrating processing flows of the information processing device.

Next, a processing flow to be executed when the information processing device 201 accepts an operation by the operation panel 101 will be described. FIG. 3 is a flowchart illustrating the processing flow. The flowchart illustrates a processing flow to be executed when the control program stored in the ROM 204 is loaded into the RAM 203 and the CPU 202 executes the control program.

The processing illustrated in FIG. 3 repeats the processing described below from when the main power source is started until when the main power source is turned off (loop 1). When the main power source is turned on (hard key is operated or power plug is connected), the loop 1 of step S301 is started and input control processing of step S302 (described below) is started.

As a result of the input control processing, in step S303, the CPU 202 determines whether there is an input signal of the key operation via the operation panel 101. If the CPU 202 determines that there is an input signal (Yes in step S303), the processing proceeds to step S304, and performs processing corresponding to the input signal. If the CPU 202 determines that there is no input signal (NO in step S303), the processing proceeds to step S305, and repeats the loop 1. When the power source is turned off, the CPU 202 ends the processing of FIG. 3.

Figure 4:
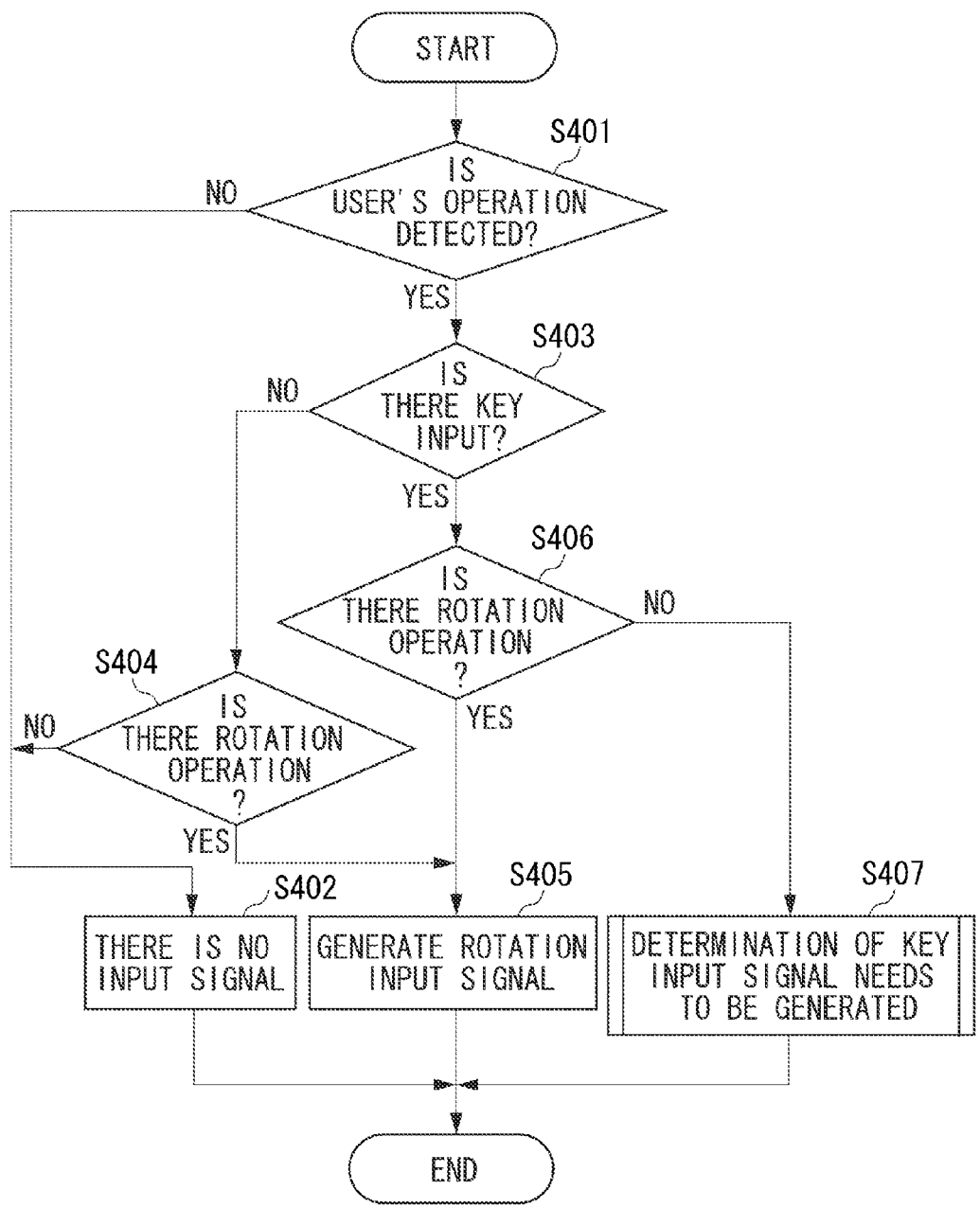

Next, the details of the input signal control processing in step S302 will be described. FIG. 4 is a flowchart illustrating the flow of this processing.

First, in step S401, the CPU 202 determines whether a user's operation is detected based on an output from the operation position detection unit 207. If a user's operation is detected, the processing proceeds to step S403, and if no user's operation is detected, the processing proceeds to step S402.

In step S402, the CPU 202 ends the processing of FIG. 4 because there is no user's operation. In step S403, based on operation position information detected by the operation position detection unit 207, the CPU 202 determines whether there is an input of a key disposed at a corresponding position. For example, if the operation position information detected by the operation position detection unit 207 indicates a position near the plus key 106, the CPU 202 determines that there is a key input by the plus key 106.

If there is no key at a position corresponding to the operation position information detected by the operation position detection unit 207, the CPU 202 determines that the user touches only a portion other than the keys and there is no key input. If the CPU 202 determines that there is a key input (YES in step S403), the processing proceeds to step S406, and if the CPU 202 determines that there is no key input (NO in step S403), the processing proceeds to step S404.

Figure 5:
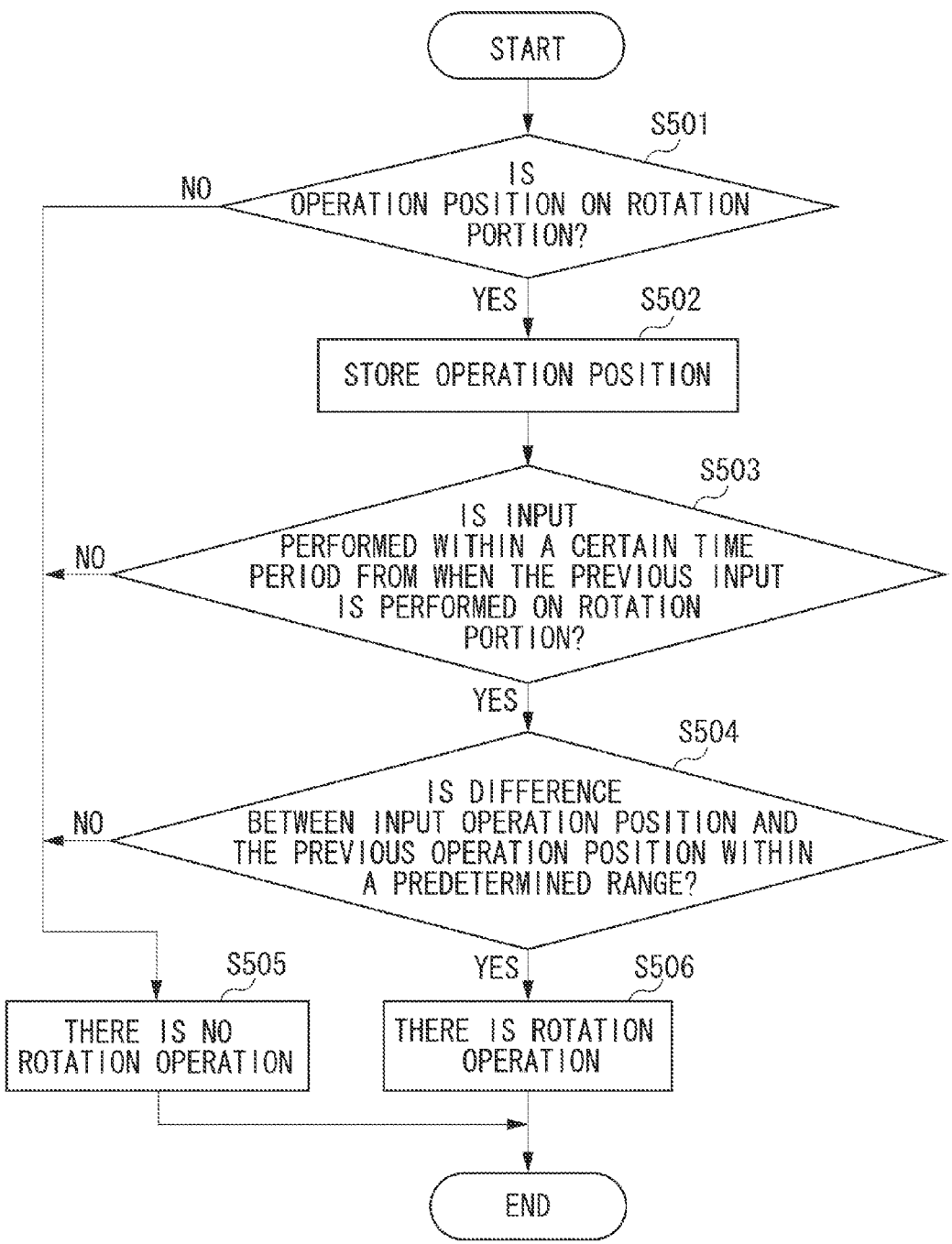

In step S404, the CPU 202 determines whether a rotation operation is performed on the rotation portion 108 based on the operation position information detected by the operation position detection unit 207. Here, the details of the determination in step S404 will be described with reference to FIG. 5. FIG. 5 is a flowchart illustrating the details of the processing in step S404.

First, in step S401, the CPU 202 determines whether the operation position information detected by the operation position detection unit 207 in step S401 indicates a position corresponding to the rotation portion 108. Here, the CPU 202 performs the determination by detecting that the electrostatic capacitance of the sensors disposed along the vicinity of the circumference of the rotation portion 108 changes by an amount larger than a predetermined amount. If the CPU 202 determines that the operation position information indicates an operation performed at a position corresponding to the rotation portion 108 (YES in step S501), the processing proceeds to step S502. If the CPU 202 determines that the operation position information indicates an operation at a position not corresponding to the rotation portion 108 (NO in step S501), the processing proceeds to step S505, and determines that there is no rotation operation.

In step S502, the CPU 202 temporarily stores the operation position information detected in step S501 into the RAM 230 along with information of the time when the operation is performed (including a value smaller than one second). In step S503, the CPU 202 determines whether the input is performed within a certain time period from when the previous operation input is performed at a position corresponding to the rotation portion 108.

Here, the certain time period may be a predetermined fixed length of time, or may be a time period determined according to user's operation history. Further, the certain time period may be determined according to a switching speed of display contents that can be displayed by the LCD 102 according to the rotation operation.

Here, the CPU 202 determines the previous operation to the rotation portion 108 by comparing the operation position information and the time of the operation stored in the RAM 203 in step S502 by (for) the previous operation with the information stored this time (information for the current operation) in step S502. However, it is not limited to this. For example, the CPU 202 may start a timer when detecting an operation at the rotation portion 108, measure the time elapsed until the next operation is detected, and determine whether the next operation is performed within a certain time period.

If the CPU 202 determines that the current operation on the rotation portion 108 is performed within a certain time period from when the previous operation is performed (YES in step S503), a continuous operation is performed, and the processing proceeds to step S504.

In step S504, the CPU 202 determines whether the difference between the operation position corresponding to the operation position information of the previous operation and the operation position corresponding to the current operation position information is within a predetermined range. Here, the CPU 202 determines whether the distance between the previous operation position and the current operation position is within an allowable range that is to be accepted as a rotation operation. In other words, the CPU 202 determines the number of sensors between the sensor that detects the previous operation on the circle of the rotation portion 108 and the sensor that detects the current operation, and if the number is within an allowable range, the CPU 202 determines that the current operation is performed within a predetermined range.

For example, even if the operation is performed on the circle, and the operation position is opposite to the previous position, the CPU 202 determines that the user does not perform the rotation operation. Here, the predetermined range may be a fixed value, or may be a value determined according to user's operation history. When the rotation portion 108 may have various shapes, the predetermined range may be a value determined according to the shape of the rotation portion.

If the CPU 202 determines that the difference is within the predetermined range (YES in step S504), the processing proceeds to step S506 and determines that there is a rotation operation. If the CPU 202 determines that the difference is out of the predetermined range (NO in step S504), the processing proceeds to step S505 and determines that there is no rotation operation. When the number of the sensors is large and the distance can be finely determined, the CPU 202 can determine that the user does not intend to perform the rotation operation when the predetermined range is too small (NO in step S504), and the processing may proceed to step S505.

If there is no previous operation, the determination results of steps S503 and S504 are "NO", and the CPU 202 performs the determinations in steps S503 and S504 when the next operation is performed.

In the manner as described above, the CPU 202 determines whether an appropriate continuous operation is performed at a position corresponding to the rotation portion 108 (whether an operation is performed at a predetermined position within a predetermined period of time). However, this method is not limited to the procedure described above, but various methods may be used. In the determination in step S506, the CPU 202 determines whether the rotation operation is a clockwise rotation or a counterclockwise rotation, and temporarily stores the determination result in the RAM 203.

Returning to the description of FIG. 4, in step S404, the CPU 202 determines whether there is a rotation operation by the procedure described referring to FIG. 5, and if the CPU 202 determines that there is no rotation operation (determines that there is no rotation operation in step S505) (NO in step S404), the CPU 202 determines that there is no input signal in step S402, and ends the processing here without generating an input signal indicating a key operation.

On the other hand, if the CPU 202 determines that there is a rotation operation (determines that there is a rotation operation in step S506) (YES in step S404), the CPU 202 generates an input signal indicating a rotation operation in step S405. Here, the CPU 202 generates an input signal for performing a clockwise rotation or a counterclockwise rotation according to the determination in FIG. 5. This result is reflected to a display result of the LCD 102 according to an output from the display unit 205.

In step S406, the CPU 202 determines whether a rotation operation is performed on the rotation portion 108 based on the operation position information detected by the operation position detection unit 207. Here, in the same manner as in step S404 (procedure in FIG. 5), the CPU 202 determines whether there is a rotation operation. If the CPU 202 determines that there is no rotation operation (NO in step S406), the processing proceeds to step S407 and performs processing for determining whether it is necessary to generate a key input signal corresponding to the key determined in step S403.

Figure 6:
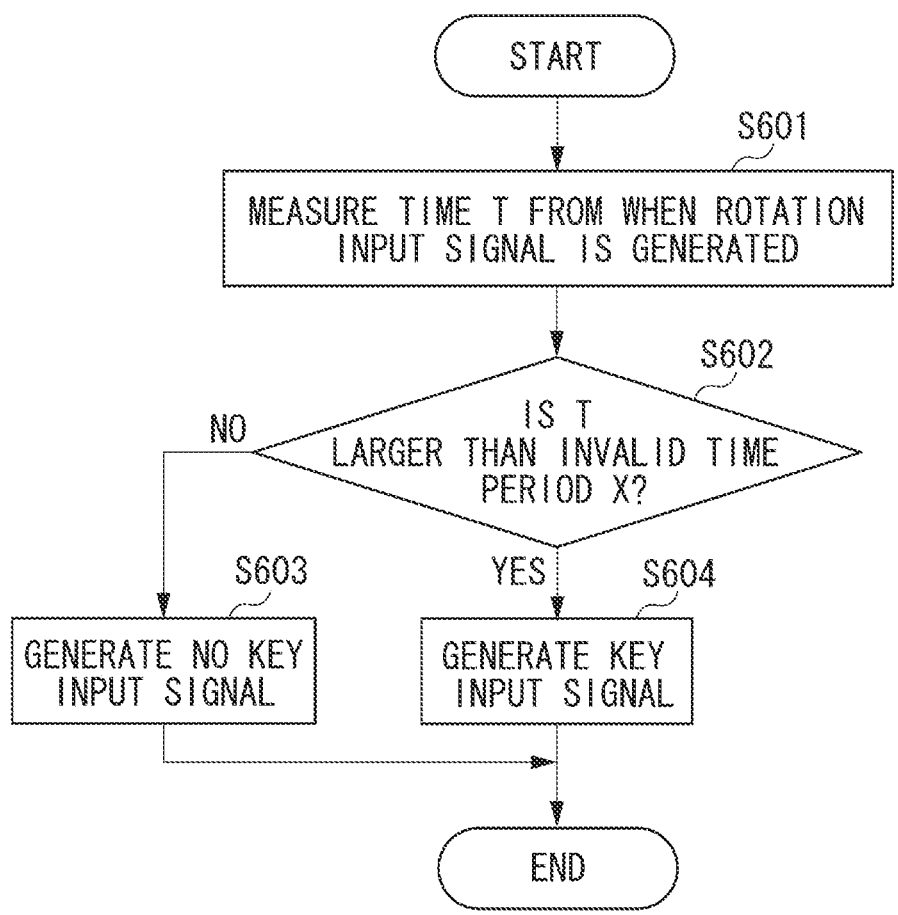

FIG. 6 is a flowchart illustrating details of the processing in step S407. The RAM 203 stores in advance a time period X for invalidating the previous operation information if a certain time elapses from when a rotation operation is performed to when the next operation is performed.

In step S601, a time T elapsed from when the latest rotation input signal is generated to when the CPU 202 determines that there is a key input in step S403, is measured. Here, the time T may be measured based on the operation position information and the time of the operation stored in the RAM 203 as described in step S502 in FIG. 5, or may be measured by a timer started when the rotation input signal is generated.

In step S602, the CPU 202 determines whether T is greater than X. If T is smaller than or equal to X (NO in step S602), the processing proceeds to step S603, and determines that the CPU 202 does not generate a key input signal corresponding to the key input determined in step S403. This is because it is highly probable that the user accidentally touches an area near the keys 103 to 107 while performing a rotation operation according to the rotation portion 108.

On the other hand, if the CPU 202 determines that T is greater than X (YES in step S602), the CPU 202 generates an input signal in step S604 because the key input determined in step S403 is not an accidental touch during the rotation operation. If the rotation operation has not been performed since the information processing device 201 was turned on, the determination result in step S602 is YES, and the processing proceeds to step S604.

As described above, according to the processing in FIG. 6, if the user touches the keys 103 to 107 in a short time from the last rotation operation, the CPU 202 determines that the user accidentally touches the keys 103 to 107 and invalidates the key input. Thus, an appropriate input can be performed.

On the other hand, if the CPU 202 determines that there is a rotation operation (YES in step S406), the processing proceeds to step S405 and generates an input signal for performing a clockwise rotation or a counterclockwise rotation according to the determination in FIG. 5. In this case, the CPU 202 determines that the user's touch to the keys 103 to 107 is accidental and preferentially accepts the rotation operation.

In the processing of FIG. 6, if the determination result of step S602 is NO, the CPU 202 determines that a rotation operation is performed. In this case, the CPU 202 may generate a rotation input signal and cause the LCD 102 to continuously progress the display that follows the rotation operation.

In step S602 in FIG. 6, although the CPU 202 determines whether T is greater than X, the CPU 202 may determine whether T is greater than or equal to X. In this case, if T is greater than or equal to X (YES in step S602), the processing proceeds to step S604, and generates an input signal of a corresponding key. If T is smaller than X (NO in step S602), the processing proceeds to step S603, and generates no input signal.

As described above, according to the present exemplary embodiment, even if the user accidentally touches another key during a rotation operation, the CPU 202 determines that the user's touch is an erroneous operation and invalidates the input of the key. Therefore, it is possible not to accept an operation that is not intended by the user.

In the above processing, even when a rotation operation is being performed, the CPU 202 detects an input of another key and invalidates the input of the key. However, the CPU 202 may not detect an input of another key while the CPU 202 determines that a rotation operation is being performed. Thereby, it is possible not to accept an erroneous key input. In other words, when the CPU 202 determines that a continuous operation such as a rotation operation is started, the CPU 202 does not detect an input from the keys while the continuous operation is being performed (for example, until the finger of the user is detached from the pad).

Although, in the above description, all of the keys 103 to 107 are targets to be determined, only the keys disposed near the rotation portion 108 (for example, keys 104, 105) may be determined. In other words, keys apart from the rotation portion 108 may be not processed by the above-described processing, and key input signals may be generated.

Although, in the above example, the user's continuous operation is an operation along the circular rotation portion 108, it is not limited to this, and the operation may be an operation along a circumference of a closed area such as a polygon-shaped area or a continuous operation tracing a simple line segment (straight line or curved line) instead of a closed area.

Although, in the above description, an electrostatic pad is used as the touch panel, even when a pressure-sensitive touch panel is used, it is possible not to accept a touch operation during the continuous operation in the same manner as the electrostatic pad.

The present exemplary embodiment is also realized by performing the processing described below. That is, software (program) that realizes the functions of the above-described exemplary embodiment is provided to a predetermined system or a device via a network or various storage media. A computer (CPU or micro processing unit (MPU)) of the system or the device reads and executes the program, and thereby the exemplary embodiment can be realized. The program may be executed by a single computer or by a plurality of computers in cooperation with each other. All the processing described above need not be realized by software, but part or all of the processing may be realized by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-162102 filed Jul. 16, 2010, which is hereby incorporated by reference herein in its entirety.

What is claimed is:

1. An operation device comprising:
a first acceptance unit configured to accept a continuous operation in which a user can perform a tracing operation on a first area of an operation panel;
a second acceptance unit configured to accept a touch operation in which the user touches a second area of the operation panel, the tracing operation not being performed in the touch operation; and
a control unit configured to perform control so that a second predetermined process corresponding to the touch operation accepted by the second acceptance unit is not executed for a predetermined period of time after termination of the continuous operation accepted by the first acceptance unit, and that a first predetermined process corresponding to the continuous operation accepted by the first acceptance unit is executed in response to acceptance of the continuous operation regardless of an elapsed time after a termination of the touch operation accepted by the second acceptance unit.

2. The operation device according to claim 1, wherein the control unit invalidates an acceptance of the touch operation by the second acceptance unit for the predetermined period of time after the termination of the continuous operation accepted by the first acceptance unit.

3. The operation device according to claim 2, wherein the first acceptance unit accepts an operation as the continuous operation when a plurality of positions in a predetermined region in the first area are operated in the predetermined period of time.

4. The operation device according to claim 1, wherein the first acceptance unit accepts an operation as the continuous operation when the first area on the operation panel is continuously operated for a predetermined period of time.

5. The operation device according to claim 1, wherein the operation panel detects a position operated by the user with a plurality of sensors and accepts a user's operation by the first acceptance unit or the second acceptance unit according to the detected position.

6. The operation device according to claim 5, wherein the operation panel detects a position operated by the user by detecting a change of electrostatic capacitance with the plurality of sensors.

7. The operation device according to claim 1, wherein the control unit is configured to perform control so that the second predetermined process is not executed while the first acceptance unit is accepting the tracing operation.

8. The operation device according to claim 1, wherein if a user executes both of the tracing operation and the touch operation, the first predetermined process is executed and the second predetermined process is not executed.

9. The operation device according to claim 1, wherein the first area is an area arranged in a circular pattern, and the second area is an area arranged in the first area.

10. The operation device according to claim 9, wherein the first area is an area arranged in a circular pattern, and the second area is an area arranged outside of the first area.

11. The operation device according to claim 1, wherein the operation device is a copy machine, a facsimile machine, a digital camera, a personal computer, a mobile phone, or a music player.

12. The operation device according to claim 1, wherein the operation device is a printer.

13. The operation device according to claim 1,
further comprising a determination unit configured to determine whether the predetermined period of time has elapsed, wherein in a case where the continuous operation is terminated, the determination unit executes the determination and the control unit performs control so that the second predetermined process is not executed until the determination determines that the predetermined period of time has elapsed after the termination of the continuous operation, and wherein in a case where the touch operation is terminated, the determination unit does not execute the determination and the control unit performs control so that the first predetermined process is executed in response to acceptance of the continuous operation.

14. A control method of an operation device, the control method comprising:
accepting, by a first acceptance unit, a continuous operation in which a user can perform a tracing operation on a first area of an operation panel;
accepting, by a second acceptance unit, a touch operation in which the user touches a second area of the operation panel, the tracing operation not being performed in the touch operation; and
controlling, by a control unit, so that a second predetermined process corresponding to the touch operation accepted by the second acceptance unit is not executed for a predetermined period of time after termination of the continuous operation accepted by the first acceptance unit, and that a first predetermined process corresponding to the continuous operation accepted by the first acceptance unit is executed in response to acceptance of the continuous operation regardless of an elapsed time after a termination of the touch operation accepted by the second acceptance unit.

15. The control method according to claim 14, wherein the touch operation is invalidated for the predetermined period of time after the termination of the continuous operation accepted by the first acceptance unit.

16. The control method according to claim 15, wherein an operation is accepted as the continuous operation when a plurality of positions in a predetermined region in the first area are operated in the predetermined period of time.

17. The control method according to claim 14, wherein an operation is accepted as the continuous operation when the first area on the operation panel is continuously operated for a period of time.

18. The control method according to claim 14, wherein a position operated by the user on the operation panel is detected by using a plurality of sensors and a user's operation is accepted as the continuous operation or the touch operation in accordance with the detected position.

19. The control method according to claim 18, wherein a position operated by the user on the operation panel is detected by detecting a change of electrostatic capacitance with the sensors.

20. The control method according to claim 14, wherein the controlling step performs control so that the second predetermined process is not executed while the first acceptance unit is accepting the tracing operation.

21. The control method according to claim 14, wherein if a user executes both of the tracing operation and the touch operation, the first predetermined process is executed and the second predetermined process is not executed.

22. The control method according to claim 14, wherein the first area is an area arranged in a circular pattern, and the second area is an area arranged in the first area.

23. The control method of an operation device according to claim 14,
further comprising a determining, by a determination unit, whether the predetermined period of time has elapsed,
wherein in a case where the continuous operation is terminated, the determining step executes the determination and the control unit performs control so that the second predetermined process is not executed until the determination determines that the predetermined period of time has elapsed after the termination of the continuous operation,
and wherein in a case where the touch operation is terminated, the determining step does not execute the determination and the controlling step performs control so that the first predetermined process is executed in response to acceptance of the continuous operation.

24. A non-transitory computer-readable storage medium storing a program causing a computer to execute the control method of the operation device according to claim 14.

* * * * *